Patented Feb. 21, 1939

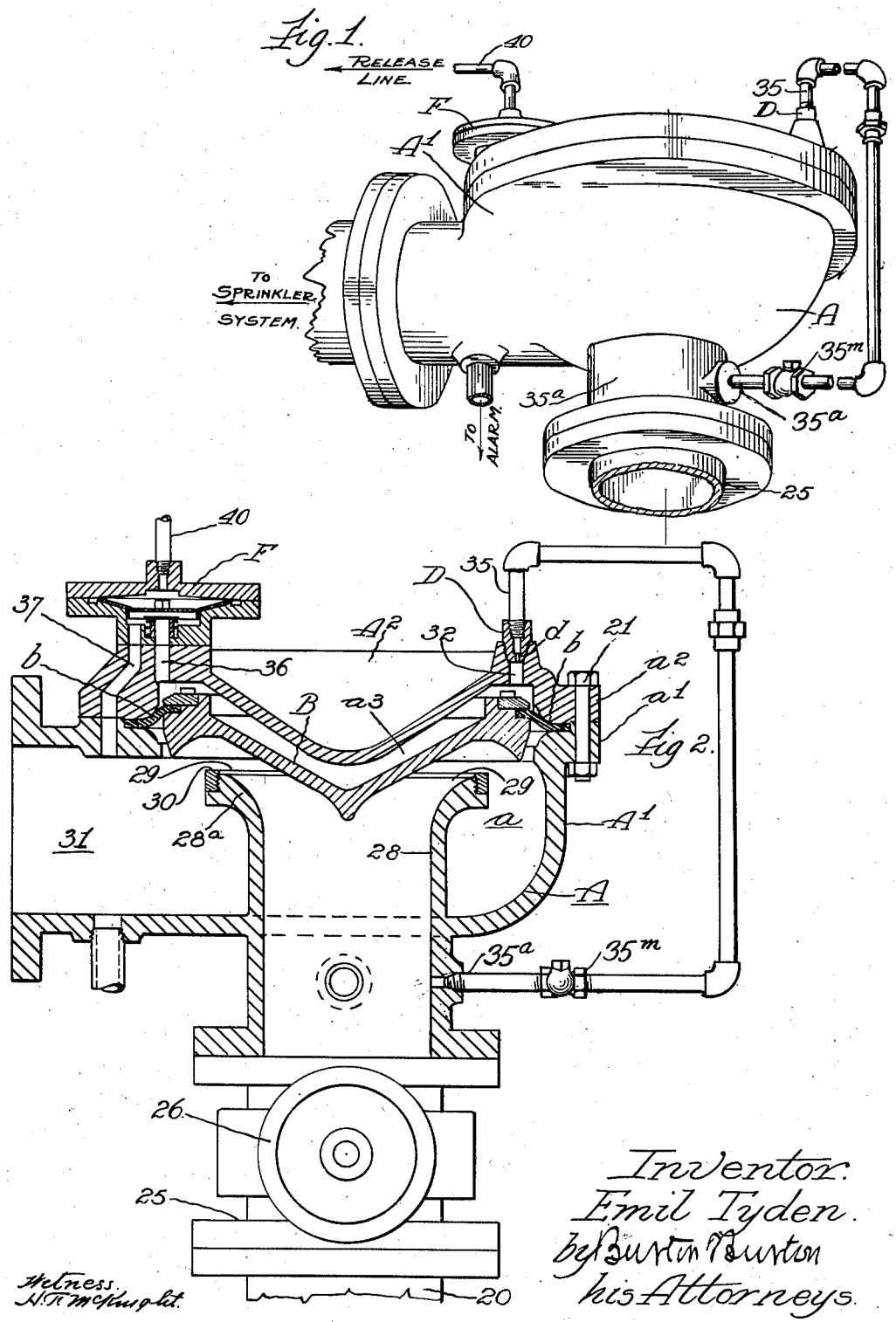

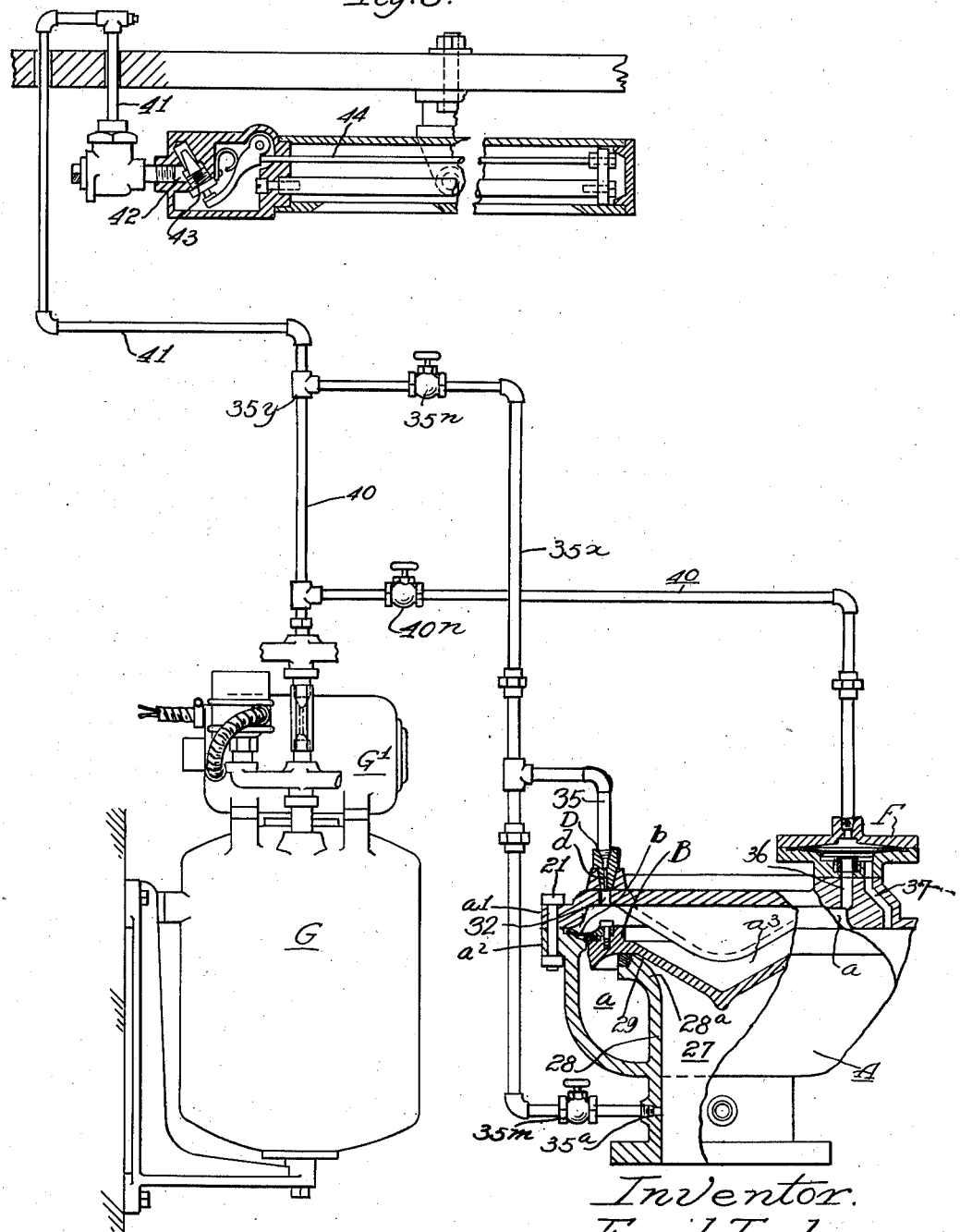

2,148,383

UNITED STATES PATENT OFFICE 2,148,383

CONTROL VALVE

Emil Tyden, Hastings, Mich.

Application April 2, 1936, Serial No. 72,278

5 Claims. (Cl. 137—139)

This invention relates to discharge valves designed for controlling water and other liquids, and its primary purpose is to provide a valve designed to deliver a large quantity of water or other liquid promptly and with a minimum frictional loss; another object is to provide a valve in which a relatively small opening movement of the valve member shall afford ample discharge capacity, and by which the direction of flow may be altered with a minimum loss of pressure or velocity. The invention is illustrated herein as applied to a fire extinguishing apparatus, and consists of certain features and elements of construction in combination as shown and described and as indicated by the claims.

In the drawings:

Figure 1 is a perspective view of the main valve body and pipe connections of a fire extinguishing system embodying this invention.

Figure 2 is an axial section of the main valve body.

Figure 3 is a diagrammatic view showing in elevation a compressed air storage chamber and associated elements which are connected with the main valve body for certain purposes, including two alternative means of effecting one of those purposes.

Referring to the drawings in detail: The water supply pipe from the water source is seen at 20; the body of the main water-controlling valve is indicated in entirety by A, comprising lower and upper members $A^1$ and $A^2$, secured together at their mated flanges $a^1$ and $a^2$, as indicated by bolts 21. At 25 there is shown a pipe coupling connecting the main supply pipe 20 and the main valve body A, said coupling containing a shut-off valve indicated by its operating handle 26, said shut-off valve being thus interposed between the water supply main and the water-controlling valve of the system.

The main valve body A, containing the main valve chamber, indicated in totality at $a$, has an inlet passage 27 which extends in a tubular extension 28 of the water inlead line, said inlet passage leading to the inlet port seen at 29 encompassed by the main valve seat indicated at 30. The body A has outflow passage 31 leading laterally, radially with respect to the inlet passage and tubular extension of the water inlead line or valve seat member 30. The main valve B is of the type commonly called a diaphragm valve, mounted at its entire periphery in the valve chamber wall, thus making the valve constitute a partition dividing the valve chamber into two compartments, of which the upper compartment, indicated at $a^3$, is hereinafter referred to as the pressure chamber, for reasons which will appear. This diaphragm valve has its outermost circumferential part of flexible material of sufficient width radially with respect to the diaphragm valve to permit the valve to move bodily to and from its seat for seating and unseating. As shown, this peripheral flexible annular part, indicated at $b$, is clamped at its outer circumferential margin between the mated flanges $a^1$, $a^2$ of the lower and upper members $A^1$ and $A^2$ of the valve body A. As thus mounted, and with the flexible mounting part flexed as in the opening movement of the valve, the upper surface of the valve is slightly spaced from the inner surface of the upper valve body member $A^2$, being the inner surface of the compartment of the valve chamber referred to as the pressure chamber. Said upper member $A^2$ has a port, indicated at 32, at which is mounted a pipe fitting D having a very restricted passage, as seen at $d$. This restriction fitting D is connected by a slender pipe line 35 to the water supply line at a point antecedent to the main valve, as seen at $35^a$. The purpose of this connection is to communicate the water supply pressure to the diaphragm main valve at the side opposite the valve seat, where its area exposed to pressure is greater than the area of the inlet port at which the valve is directly exposed to the water supply pressure. This connection may be referred to as a pressure flow connection from the main water supply line to the main water pressure chamber by-passing the diaphragm valve seat. And the reason for thus communicating the pressure, it will be understood, is to utilize the water supply pressure for operating on the main valve at the side opposite the valve seat for holding the valve normally seated against the supply pressure. The present construction, it will be noted, thus departs from the customary construction of dry pipe valves in which the main valve is held normally seated against the water supply pressure by the system air pressure operating on the larger area of the valve. With the construction above described departing from the usual construction, it will be recognized that the valve will not be opened upon the reduction of the air pressure resulting from the opening of the discharge water heads, as in the customary construction; and some means must be provided for releasing the valve from the water pressure when the valve should open for delivery of water to the system upon the opening of the water discharge heads by fire heat in the protected apartment. This is effected in the present construction by providing a water passage comprising two ducts, seen at 36 and 37 in Figure 2, the duct 36 leading from the pressure chamber $a^3$ into the chamber of a diaphragm valve device seen at F, and the duct 37 leading from the chamber of the diaphragm valve device to the water discharge passage 31, the total passage 36, 37 being controlled by the valve of said diaphragm valve device, as will now be described.

The chamber of the diaphragm valve F is connected by a slender pipe line 40 with the compressed air storage chamber seen at G in Figure 3, from which the normal air pressure of the system is derived. The pipe line 40 has a branch 41 leading to a vent port seen at 42 controlled by a valve 43 operable by the slender rod 44 of the rate-of-rise thermostat of the type shown in my Patent No. 1,877,088, of which the operating end portion is shown in Figure 3. The response of the rate-of-rise thermostat to fire heat in the apartment in which it is located being movement of the slender, and thereby more responsive rod 44 operating the valve 43 for opening, causes the air pressure in the branch pipe line 41, and thereby in the line 40, to be vented, releasing the valve of the diaphragm valve device F for being opened by pressure from the pressure chamber $a^3$, from which the water is discharged into the discharge passage 31; and the main valve B, being thus relieved of the pressure by which it was held seated, is opened by the water supply pressure; and the water from the main valve supply line is delivered to the system for discharging at the water discharge heads (not shown) which may be opened by fire heat in the protected apartment.

Instead of admitting the water supply pressure to the compartment $a^3$ for holding the main valve seated against the water supply pressure acting on the valve area exposed at the inlet port of less area than the area of the valve at the side exposed to the pressure which may be produced in the pressure compartment, provision may be made for admitting to the pressure compartment $a^3$ at the restriction D, air pressure equal to the pressure normally maintained in the air pressure region of the system. Construction for this purpose is shown in Figure 3, in which there is shown a branch $35^x$ of the pipe line 35 connected to the restriction fitting D, said branch $35^x$ being connected, as seen at $35^y$, with the pipe line 40, which leads from the compressed air storage tank G. The release of the valve device F for venting the pressure in the pressure compartment $a^3$, which release is effected by the connection of the pipe line 40 through the pipe line 41 with the rate-of-rise thermostat as described, it will be recognized operates when the connection to the restriction D is from the air pressure in the same manner as when the connection to said restriction D is from the water pressure. When pipe line connection for pressure to the restriction D is made both from the main water supply line and from the compressed air storage tank, a shut-off valve must be interposed in each pipe line connection to be closed when the other pressure connection is being used. Such shut-off valves are shown in Figure 3 at $35^m$ and $35^n$, controlling respectively the connection with the water supply line and the connection with the compressed air storage tank, the valve $35^n$ controlling the air pressure connection being a shut-off-and-check valve, which automatically closes against back-flow toward tank G, and this traps the air in compartment $a^3$.

It may be understood that the reason for preferring the construction for connecting the pressure compartment at the restriction D with the source of water pressure rather than with the source of air pressure, is that in case of failure or substantial decline of the air pressure the main valve would be forced open by the water supply pressure and the system would be flooded in the absence of any fire conditions in the protected apartment. But it may be understood that since the air pressure in the compressed air storage tank G is produced and maintained by the electric-motor-driven pump, indicated at $G^1$ in Figure 3, operation of the motor for driving the pump may be automatically controlled by the pressure in the storage tank, and decline of that pressure will be not liable to occur. Accordingly, when the motor driving the pump, producing the pressure in the compressed air storage tank, is governed automatically by the pressure in the storage tank, the liability to decline of pressure to a degree too low for holding the main valve seated against the water supply pressure by the air pressure passing the restriction D is too slight to constitute an objection to connecting the air pressure instead of water pressure at the restriction D. And, in any event, making the valve $35^n$ a shut-off-and-check valve practically ensures that there will be no decline of air pressure in the pressure compartment $a^3$, since that pressure will be introduced from the compressed air storage tank in the original set-up of the system, and in the re-setting-up after each operation for fire extinguishment.

For effecting the primary purpose of the invention,—minimizing the resistance to water flow due to friction or change of direction,—the main valve is mounted in a manner adapting it to seat substantially simultaneously throughout the circumference of the inlet port and valve seat, as by making it a diaphragm valve mounted at the outer circumference on the chamber wall (though the invention is not limited to a diaphragm valve), and this main valve, as to the entire extent within the circle of its contact with the valve seat, is made in inverted cone form co-axial with the inflow passage 27. This avoids the abrupt change of direction of the water discharge which is inevitable in any construction in which the water makes impact with the valve at right angles, or nearly at right angles, to the valve fact. To cooperate with this conical form of the valve B the water inflow passage 27, leading to the inlet port and main valve seat 30, is radially widened or flared at a terminal portion $28^a$, and this flaring portion is preferably convexly curved so that it does not mate flatly with the conical surface of the valve B, but said conical surface and the convexly flared surface converge toward the flat annular valve seat 30 with which a corresponding flat annular surface of the valve member forms the only contact between the valve and the inlet. In addition, the curved outflow passage is further defined by an outer marginal portion of the valve B, which is concavely curved, trending downwardly toward the annular chamber $A^1$, whose smoothly rounded walls receive the flow, and change its direction with a minimum friction loss.

The novel effect of the radial enlargement of the flow passage, increasing the diameter of the inlet port through which the water is discharged upon the opening of the valve, is to reduce the extent to which the valve must be opened, i. e., the distance which it must move away from the seat,—to accommodate the discharge of the amount of water which will pass at a given speed through the flow passage antecedent to the enlargement. As shown, the diameter of the port and of the circle at which the valve contacts the seat is substantially fifty percent greater than the diameter of the flow passage antecedent to the enlargement, thus increasing the area of the opening afforded by a given movement of the valve away from its seat 30, or reducing the necessary movement of the valve to produce a given area of opening. The radially curved, inwardly convex form of the tapering enlargement of the passage leading to the port and valve seat causes the water following the curved path to be centrifugally stressed off from the convex flaring surface of the terminal portion of the inflow passage to an extent tending very materially to reduce the frictional resistance to flow. And the friction incident to changing the direction of flow is further reduced by the downwardly curving form of the marginal portion of valve B beyond its seat, for guiding the water into the bowl-like lower chamber $A^1$ with its rounded contours leading to the outlet 31.

Thus, by reducing the distance which the valve must be opened to accommodate a given rate of flow, and reducing the friction resulting from the flow at whatever rate, the flow capacity of the passage and port is very substantially improved by giving the parts the form described and shown. The construction herein described as associated with fire extinguishing appratus may be adapted for other uses involving the control of liquid under pressures and the discharge of such liquid particularly where it is desirable that such discharge take place promptly and rapidly and without substantial impairment through friction loss. The invention is therefore not limited to the function of fire extinguishment, although in the form illustrated it is specifically adapted to that use.

I claim:

1. The combination of a liquid supply passage and a valve controlling discharge therefrom, said passage terminating in a flat annular valve seat in a plane substantially perpendicular to the axis of the passage and the terminal portion of the passage leading to the seat being flared to increase its diameter at the valve seat, said valve being mounted by means of a flexible annular member permitting limited movement of the valve toward and from its seat substantially in the direction of the axis of said supply passage, and having a flat annular seating surface and a tapered surface extending thereto from a point in the passage substantially at the axis of the latter, said tapered surface extending opposite the flared surface of the passage but out of contact therewith when the valve is seated.

2. In combination with a liquid supply passage and a valve controlling discharge therefrom, a valve chamber into which the terminal portion of the passage is protruded, terminating in a valve seat within the chamber, the terminal portion of the passage leading to the seat being flared to increase its diameter at the valve seat, said seat extending in a plane substantially perpendicular to the axis of the passage, and the valve member having a flat annular seating surface and a tapered surface sloping conically outward from a point in the passage substantially at the axis of the latter to the seating surface of the valve, said valve also including a portion which extends outwardly beyond the seat having a surface which is continuous with the seating surface of the valve and which is concavely curved for deflecting the flow of liquid into the chamber into which the terminal of the passage protrudes.

3. In combination with a liquid supply passage and a valve controlling discharge therefrom, a valve chamber into which the terminal portion of the passage is protruded, terminating in a valve seat within the chamber, the terminal portion of the passage leading to the seat being flared to increase its diameter at the valve seat, said seat extending in a plane substantially perpendicular to the axis of the passage, and the valve member including a portion which extends outwardly beyond the seat having a surface which is continuous with the seating surface of the valve and which is concavely curved for deflecting the flow of liquid discharged over the seat when the valve is opened, said valve chamber including a space extending around the protruding portion of the passage and enclosed by smoothly rounded wall surfaces substantially continuous with the curvature of the peripheral portion of the valve surface, extending adjacent thereto when the valve is open, said wall surface merging smoothly into a transverse wall of the chamber through which the terminal of the supply passage protrudes, said transverse wall having an aligned lateral extension which constitutes a portion of a laterally directed discharge passage.

4. The combination of a liquid supply passage, a valve controlling discharge therefrom and a valve chamber in which the passage terminates in an annular valve seat, the terminal portion of the passage leading to the seat being flared to increase its diameter at the valve seat, the valve being tapered in substantially conical form with its apex disposed axially in the passage and with its conical surface sloping continuously therefrom in the direction of flow to the seat, said valve being mounted in the chamber by means of a flexible annular member permitting limited movement of the valve toward and from its seat, whereby the valve itself separates the chamber into compartments, one of which communicates directly with the supply passage when the valve is open, the side of the valve member away from the supply passage being conical with walls substantially parallel to the surface of the valve member which faces the passage, and the wall of the chamber being formed to nest in the conical valve member with limited clearance between them, means for admitting fluid pressure to the other compartment between said nested elements and directly against the valve to hold it seated, and means for venting such pressure to permit the valve to open in response to the pressure of liquid in the supply passage.

5. The combination of a liquid supply passage and a valve controlling discharge therefrom, said passage terminating in a flat annular seat in a plane substantially perpendicular to the axis of the passage, and the terminal portion of the passage leading to the seat being flared to increase its diameter at the valve seat, said valve being mounted by means of a flexible annular member permitting limited movement of the valve toward and from its seat, said valve having a flat annular seating surface of somewhat greater radial extent than that of the valve seat, and having a tapered surface sloping conically outward from a point in the passage substantially at the axis of the latter to the said flat seating surface of the valve, said tapered surface extending opposite the flared surface of the passage but out of contact therewith when the valve is seated.

EMIL TYDEN.